US006764184B1

United States Patent
Carkner

(12) United States Patent
(10) Patent No.: US 6,764,184 B1
(45) Date of Patent: Jul. 20, 2004

(54) TELESCOPICALLY COLLAPSING IMAGE PROJECTOR

(76) Inventor: Steve Carkner, 720 River Road, R.R. #1, Manotick, Ontario (CA), K4M 1B2

( * ) Notice: Subject to any disclaimer, the term of this patent is extended or adjusted under 35 U.S.C. 154(b) by 12 days.

(21) Appl. No.: 10/331,097

(22) Filed: Dec. 30, 2002

(51) Int. Cl.[7] .............................................. G03B 21/14
(52) U.S. Cl. ..................... 353/119; 353/101; 396/348
(58) Field of Search ................... 353/101, 119, 353/43; 396/348

(56) References Cited

U.S. PATENT DOCUMENTS

| | | | | |
|---|---|---|---|---|
| 3,813,156 A | * | 5/1974 | Davis | 353/119 |
| 5,150,255 A | * | 9/1992 | Lin | 359/409 |
| 6,317,262 B1 | * | 11/2001 | Hardin | 359/399 |

* cited by examiner

Primary Examiner—Russell Adams
Assistant Examiner—Michael Dalakis
(74) Attorney, Agent, or Firm—J. Gordon Thomson

(57) ABSTRACT

A telescopically collapsible image projector has a tri-segmented body. Within the body is mounted a light source, an imaging device such as a fully colour LCD display capable of receiving electronic signals representing images for display, keystone correction means, focusing means, and heat dissipation means. In its operating configuration the body segments are fully extended and a rigid optical pathway is established. Upon full extension, heat sinks in the form of air voids are created to collect radiated heat from operating components of the projector. A forced air system comprising a fan/motor combination draws cooling air in through the body of the projector and exhausts heated air through an exhaust port. In its stowed configuration, the heat sink air voids are used as stowage space to enable the body segments of the projector to telescopically collapse within each other forming a compact object with a small stowage foot print.

28 Claims, 19 Drawing Sheets

TELESCOPICALLY COLLAPSING IMAGE PROJECTOR

BACKGROUND OF THE INVENTION

1. Field of the Invention

This invention relates to the field of image projectors and more specifically an image projecting having a tubular telescoping body that is telescopically collapsible into an object with a small stowage footprint.

2. Discussion of the Prior Art

Image projectors using fully colour capable LCD systems require small but high-intensity light sources to adequately project images on a distant screen. Light sources such as xenon, halide or arc lamps are often used. Examples of such projectors include U.S. Pat. No. 6,224,216 "System and Method Employing LED Light Sources for a Projection Display" issued to Parker and Peterson on May 1, 2001; and, U.S. Pat. No. 5,820,242 "Compact Integrated LCD Projector" issued to Rodriguez and Haushalter on Oct. 13, 1998. Both of these inventions rely upon forced air-type cooling systems generally comprising a heat sink in the form of air filled voids and a fan/motor combination to circulate air and dissipate heat through vents in the body of the projector. Image projectors of this type are necessarily voluminous to accommodate the required air voids for the cooling system and tend to retain a rectangular shape. Neither example of existing projectors is collapsible to the extent possible by utilizing heat sink air voids as stowage space.

Therefore, there continues to be a need for an image projector that is smaller, more portable and with a reduced foot print when operating and stowed for transport that takes advantage of unused heat sink voids as stowage space.

OBJECTS OF THE INVENTION

In light of the disadvantages noted above, it is a principle object of the present invention to provide a telescopically collapsible projector.

Another object of this invention is to provide a telescopically collapsing projector that can be substantially reduced in size for stowage while retaining the ability to produce clear, undistorted images on a projection screen.

It is a further object of the invention to provide a compact, telescopically collapsible projector that utilizes electronically addressable colour LED technology capable of taking image signals from a computer and projecting them on a distant screen.

It is yet a further object of the present invention to provide a telescopically collapsible projector that has a reduced operating and stowage footprint while retaining the ability to adequately air cool the heat producing components of the projector during operation.

Another object of the present invention is to provide for a telescopically collapsible projector that can take advantage of cool light source technologies.

SUMMARY OF THE INVENTION

The objects are achieved by providing a telescopically collapsible image projector having a segmented tubular body comprising:

a. a first tubular body segment;
b. a second tubular body segment co-axially mounted to the first tubular body segment and adapted for sliding concentric placement within the first tubular body segment; and,
c. a third tubular body segment co-axially mounted to the second body segment and adapted for sliding concentric placement within the second tubular body segment.

The image projector has a first stowed configuration in which the first, second and third tubular body segments are co-axially and telescopically collapsed within each other in concentric placement; and, a second operating configuration in which the first, second and third tubular body segments are co-axially deployed thereby forming a rigid optical pathway.

The image projector further comprises means for supporting the first tubular body segment, second tubular body segment and third tubular body segment co-axially in the second operating configuration; means for projecting an image on to a distant projection screen; means for cooling the image projector; and, means for controlling the image projector.

The first tubular body segment comprises: a closed back end; an open front end having an edge; an outer surface having an outer diameter; and, an inner surface having an inner diameter wherein the closed back end, the open front end, the inner surface and the outer surface act together to form a void. The void is adapted to receive the second tubular body segment and the third tubular body segment in respective concentric placement. The first tubular body segment further includes a flange depending radially inwards from the open front end edge. The flange has a bearing surface, a rear surface and a front surface.

The second tubular body segment comprises: an open back end having an edge; an open front end having an edge; a length; an outer surface having an outer diameter; and, an inner surface having an inner diameter wherein the open back end, the open front end, the outer surface and the inner surface act together to define a lumen. The lumen is adapted to receive the third tubular body segment in concentric placement. The second tubular body segment furthering includes: a first flange depending radially outwards from the open back end edge. The first flange has a front surface, a back surface and a bearing surface. A second flange depends radially inwards from the front end edge. The second flange has a front surface, a back surface and a bearing surface. The second tubular body segment further includes: a plurality of apertures spaced radially about its outer surface; and, a first mounting hole and a second mounting hole distally positioned at the open first end. The first mounting hole and the second mounting hole are positioned opposite each other.

The third tubular body segment comprises: an open back end having an edge; an open front end having an edge; a length; an outer surface having an outer diameter; and, an inner surface having an inner diameter wherein the open back end, the open front end, the outer surface and the inner surface define a lumen. The third tubular body segment further includes a flange depending radially outwards from the first open end edge. The flange has a back surface, a front surface and a bearing surface.

The image projector also includes means for supporting the first tubular body segment, second tubular body segment and third tubular body segment co-axially when the projector is in its operating configuration. The support means comprises means for supporting the second tubular body segment within the first tubular body segment and means for supporting the third tubular body segment within the second tubular body segment. These means comprise a first, second, third and fourth support. The first support comprises the bearing surface of the second tubular body segment first flange being in sliding frictional contact with the inner surface of the first tubular body. The second support comprises the bearing surface of the first tubular body segment flange in sliding frictional contact with the outer surface of the second tubular body. The third support comprises the bearing surface of the second tubular body segment second flange in sliding frictional contact with the outer surface of the third tubular member. The fourth support comprises the third tubular body segment flange bearing surface in sliding frictional contact with the inside surface of the second tubular body segment. These supports act together to permit telescopic co-axial sliding movement between the second tubular body segment and the first tubular segment and co-axial sliding movement between the second tubular body segment and the third tubular body segment. Hence the imaging projector may be moved from its first stowed configuration to its second operating configuration and form a rigid optical pathway. Additionally, the supports permit movement from the second operating configuration to the first stowed configuration.

Means for projecting an image on to a distant projection screen comprises the rigid optical pathway which is defined by the axis of the first tubular body segment, second tubular body segment and third tubular body segment co-axially aligned in the second operating configuration. Also included is a projection light source positioned on the optical pathway for illuminating an image for projection, a diffusing filter positioned adjacent to the light source on the optical pathway for diffusing light from the projection light source, an imaging element positioned on the optical pathway adjacent to the diffusing filter for creating images for projection and image focusing means for focusing projected images on to a distant projection screen. The projection light source comprises a device selected from the group consisting of filamented bulbs, arc lamps, fluorescent lamps, and light emitting diodes. The projection light source is mounted within a parabolic mirror. The mirror is in turn mounted to a circular frame that is mounted to the inside surface of the first tubular body segment. The frame further includes a plurality of apertures set radially at its distal periphery. The diffusing element is mounted between the projector light source and the imaging element within the first open end of the second tubular body segment. The diffusing element further comprises a plurality of apertures set radially at its distal periphery. The imaging element is mounted within a frame that is in turn mounted to the inside surface of the second tubular body segment by two co-axial pins. Each of these pins is mounted on opposite sides of the frame and adapted for insertion and rotation within mounting holes in the first end of the second tubular body segment. These pins permit the frame and imaging means to pivot for keystone correction of the projected image. The frame has an outside diameter less than the inside diameter of the second tubular body segment so that an annulus is formed permitting air flow between the frame and the inside surface of the second tubular body segment. Preferably, the imaging element is a fully colour capable single liquid crystal display. However, this invention contemplates the use of one of a plurality of monochromatic element liquid crystal displays, micro electrical mechanical systems, light valves, suspended particle devices, polysilicon displays, liquid crystal on silicon displays, and interferometric modulators. The image focusing means comprises a focusing tube with a focusing lens that act and move in combination. The focusing lens is mounted within the second open end of the third tubular body segment and is co-axial with the optical pathway. The focusing tube is capable of axial movement towards and away from the imaging element by frictionally sliding the focusing tube in and out of the second tubular body segment thereby applying focusing correction to a projected image. In an alternative embodiment of the invention, the focusing tube is threadably mounted within the second tubular body segment so that the focusing tube may be moved into and out of the second tubular body segment by rotating the focusing tube about its axis in a clockwise and counterclockwise direction. In yet another embodiment of the invention, the focusing tube is slideably moveable into and out of the second tubular body segment using rack and pinion gear system. The rack may be fixed to the outside surface of the focusing tube and operated in meshed cooperation with the pinion gear that is fixed to the inside surface of the second tubular body segment.

When the image projector is in its first stowed configuration, the entire length of the second tubular body segment is positioned concentrically within the first tubular body segment and the entire length of the third tubular body segment is positioned concentrically within the second tubular body segment. As well, the inside surface of the second tubular body first flange abuts against said circular frame of the projection light source and the inside surface of the third tubular body segment flange abuts the imaging means frame.

To dissipate heat generated by the projection light source, the image projector further includes means for cooling the image projector comprises a cooling system comprising a heat sink adjacent to the projector light source for absorbing heat the projector light source; an aperture in the centre of the closed end of the first tubular body segment for exhausting heated air; a plurality of apertures radially displaced about second tubular body segment for drawing cooling air into the image projector; and, a fan housing support mounted over the aperture adapted for mounting an electric fan/motor assembly that is capable of drawing cooling air from the plurality of apertures in the second tubular body segment and exhausting heated air from closed end aperture of the first tubular body segment.

The heat sink comprises an air-filled void adjacent to the projector light source that is formed when the segmented tubular body of the image projector is extended to its second operating configuration. When the image projector is in its stowed configuration, the air void becomes a storage chamber for the second tubular body segment and the third tubular body segment.

The image projector has control means comprising a plurality of control circuits that are adapted to operate and control the electrical and mechanical components of the projector. The control circuits are mounted to a circular circuit board that is apertured at its centre for cooling air flow. In various embodiments of the invention, the control circuit includes digital image conversion means, memory means, voice actuation and control means, digital processing means, means for audio-visual presentations and means for remote operation the image projector.

The projector further includes a circular body cap adapted to fit over the end of the projector when the projector is in its stowed configuration. The cap includes a supporting member adapted to support the third body segment when the projector is in its operating configuration. Hence the cap provides a stable support to the projector on flat surfaces.

BRIEF DESCRIPTION OF THE DRAWINGS

The foregoing and other objects, features and advantages of the invention will be apparent from the following more particular description of the preferred embodiments of the invention as illustrated in the accompanying drawings in which like reference characters refer to the same parts throughout the different views. The drawings are not necessary to scale, emphasis instead being placed upon illustrating the principles of the invention.

DETAILED DESCRIPTION OF PREFERRED EMBODIMENTS

The Tubular Body Segments

Figure 1:
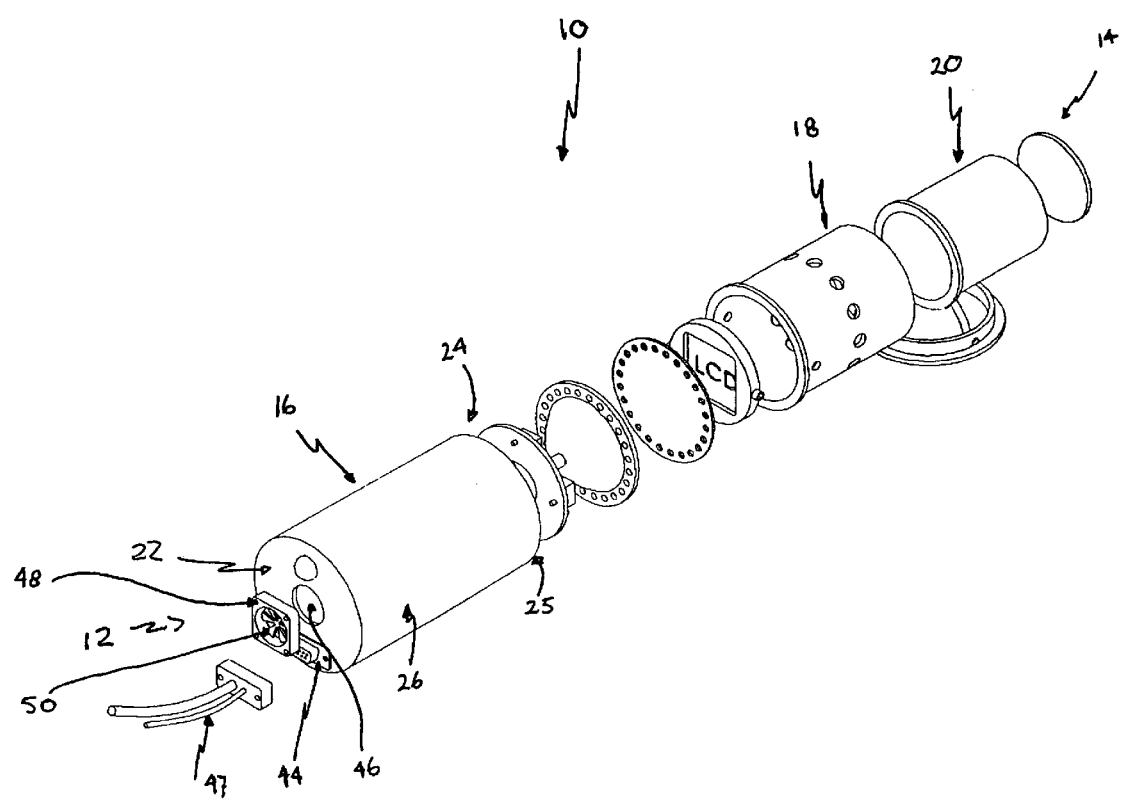
FIG. 1 is an expanded perspective back view of the invention showing the tri-segmented image projector body.
Figure 2:
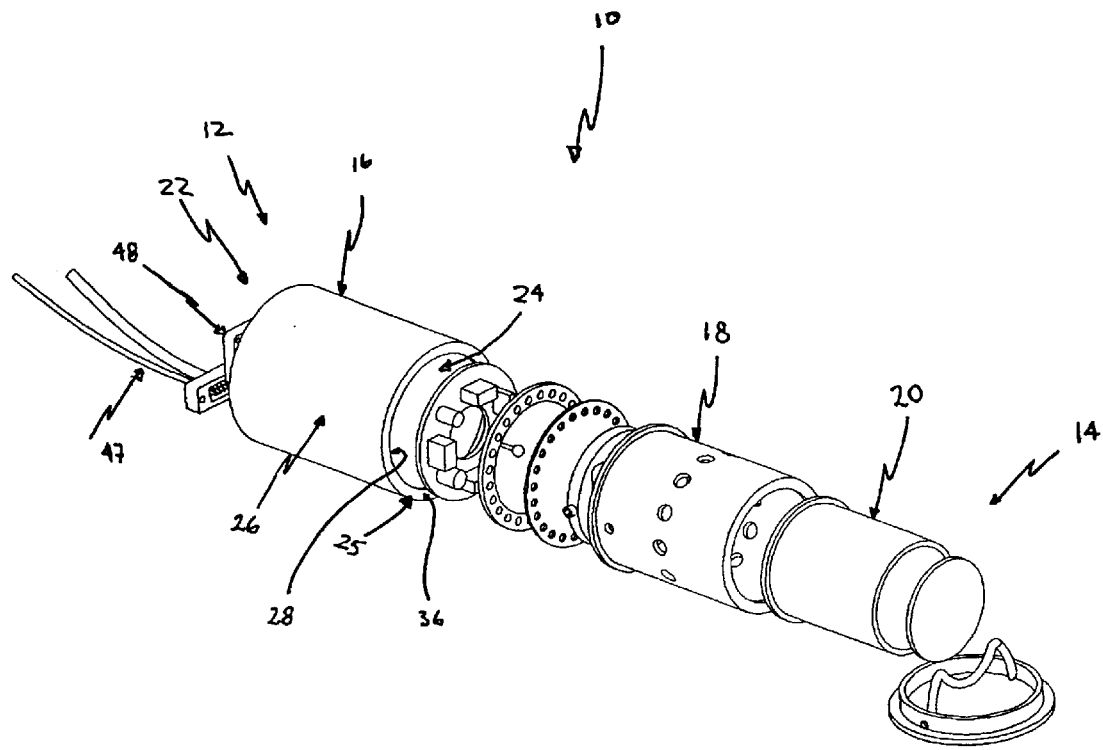
FIG. 2 is an expanded perspective front view of the invention identifying the major features of the first tubular body segment.
Figure 3:
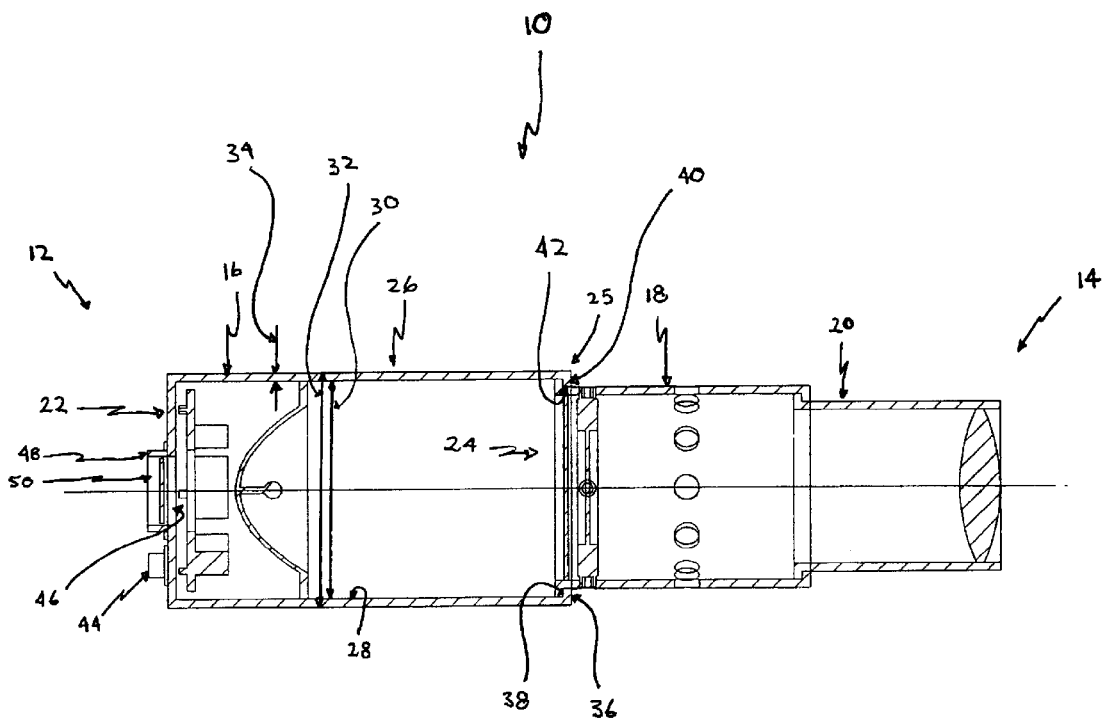
FIG. 3 is a sectional side view of the image projector in its expanded operating configuration identifying the major features of the first tubular body segment.

Referring to FIGS. 1, 2 and 3 there is shown a preferred embodiment of the telescopically collapsible projector of the present invention (10) in an expanded assembly back view (FIG. 1), an expanded assembly front view (FIG. 2) and a sectional side view in the expanded operating configuration (FIG. 3). From back (12) to front (14) the invention (10) comprises a first tubular body segment (16), a second tubular body segment (18) and a third tubular body segment (20).

Still referring to FIGS. 1, 2 and 3 the features of the first tubular body segment (16) will be described. The first tubular body segment (16) includes a closed back surface (22) and an open front end or mouth (24). The mouth (24) has an ending edge (25). The first tubular body segment (16) has an outer surface (26), an inner surface (28), an inner diameter (30) and an outer diameter (32) creating a wall thickness (34). A flange (36) depends radially inwards from the ending edge (25) of the open mouth (24) of the first tubular body (16). The flange (36) has an inner surface (38), an outer surface (40) and a bearing surface (42). The first tubular body segment (16) is adapted to accept a receptacle (44) fixed to the back surface (22). The receptacle (44) is adapted for connection to cable (47) for receiving electrical power and electronic data signals such as video streams or other data streams from such devices as keyboards, portable computers and personal computing devices. The back surface (22) of the first tubular body segment (16) is apertured (46) to form an exhaust port and is further adapted to receive a mounting frame (48) in order to mount fan/motor combination (50) for drawing cooling air through the body of the projector as more fully explained below.

Figure 4:
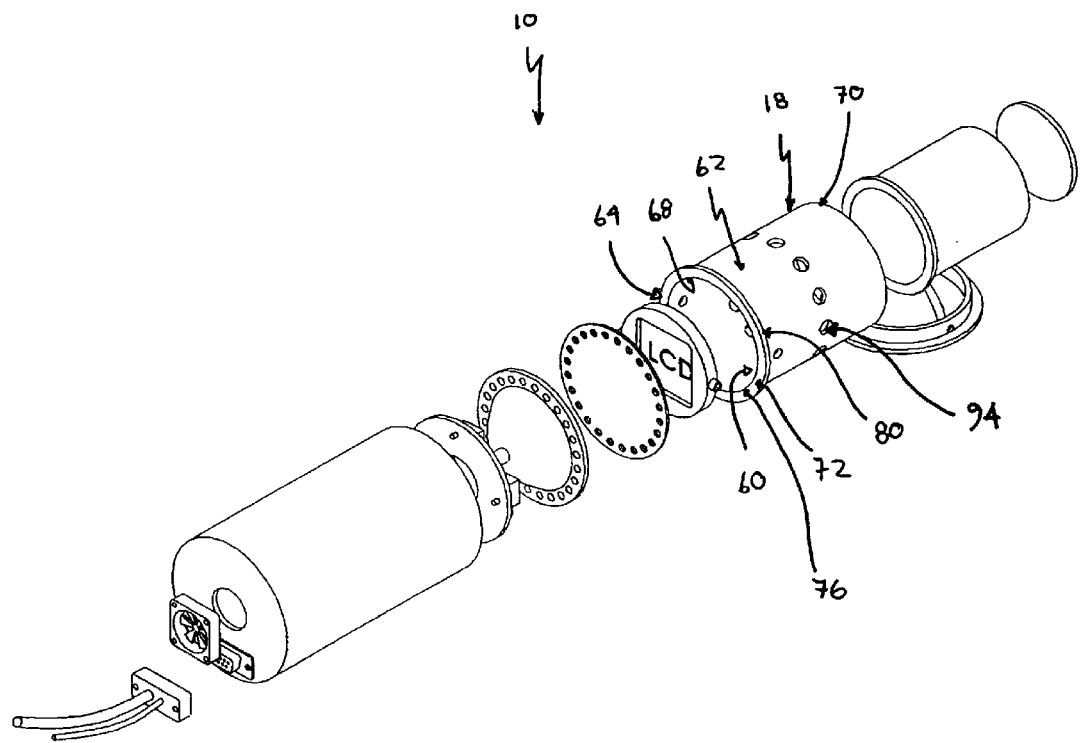
FIG. 4 is an expanded perspective back view of the invention identifying the major features of the second tubular body segment.
Figure 5:
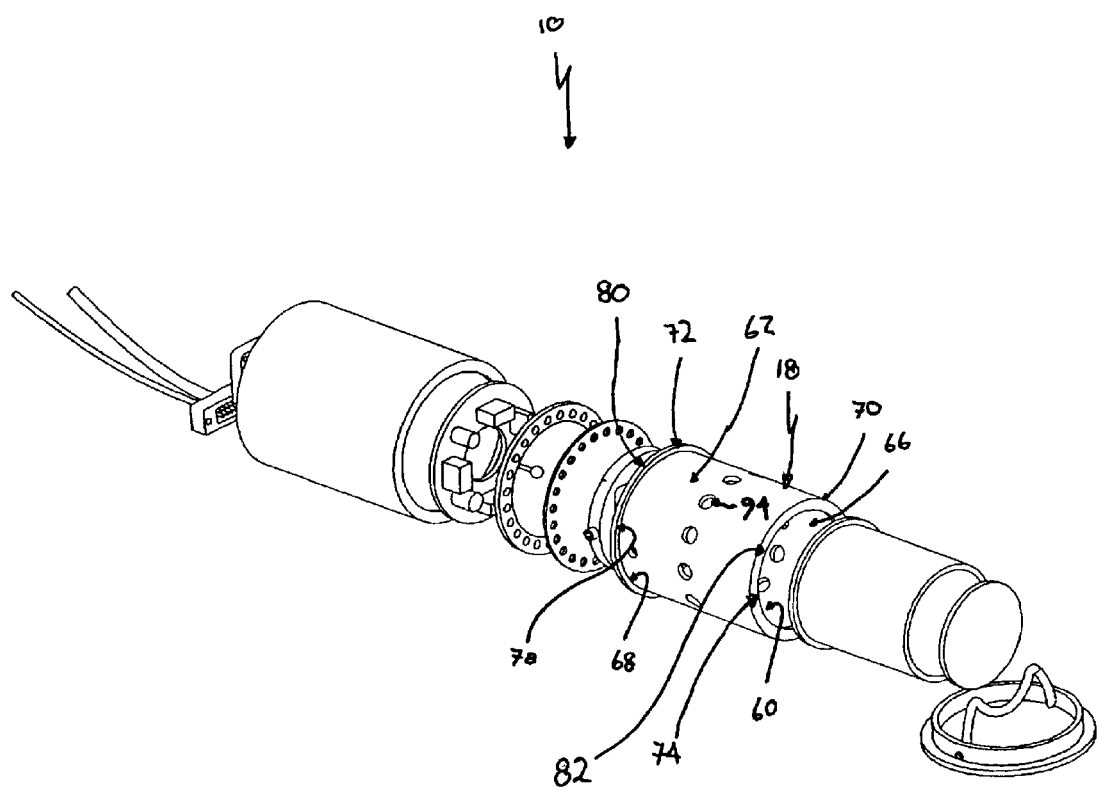
FIG. 5 is an expanded perspective front view of the invention identifying the major features of the second tubular body segment.
Figure 6:
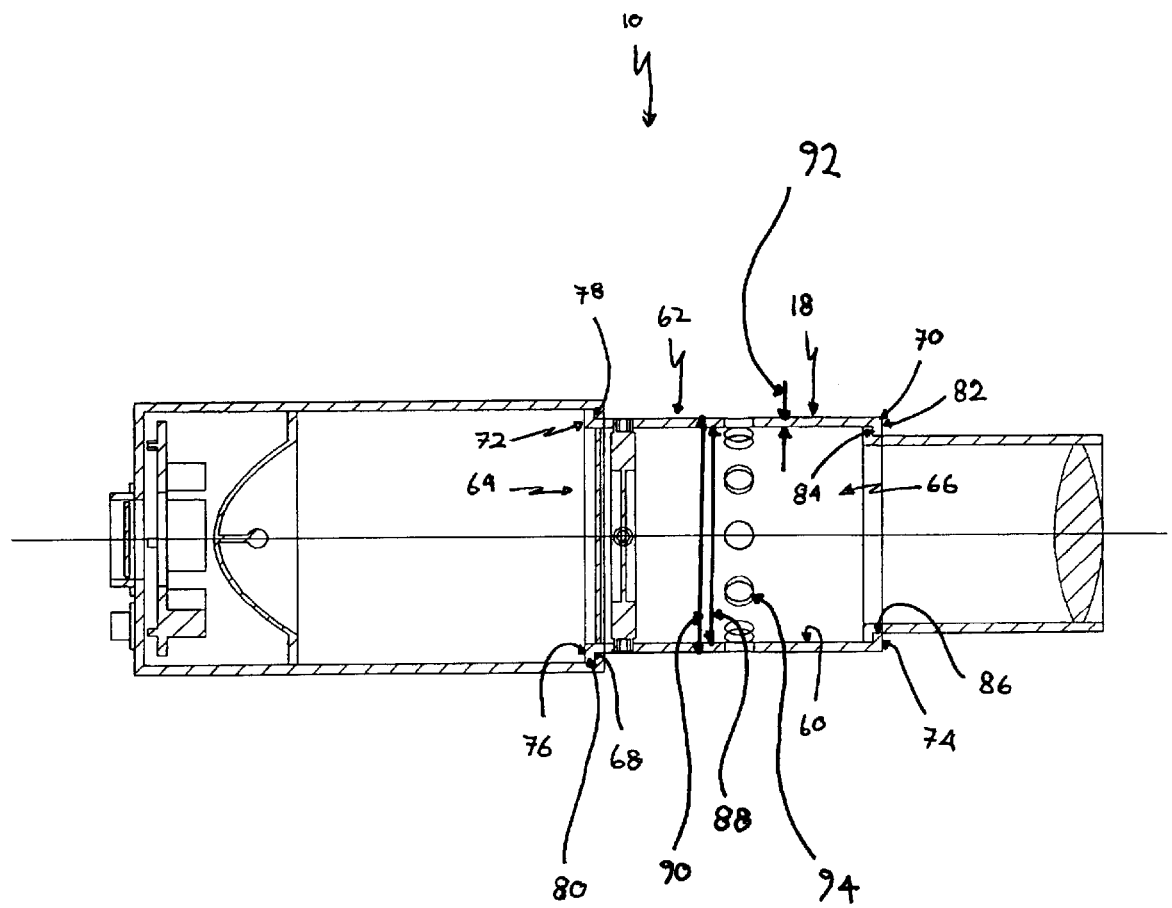
FIG. 6 is a sectional side view of the invention identifying the major features of the second tubular body segment.

Referring now to FIGS. 4, 5 and 6 there are shown the same embodiments of the invention (10) as shown in FIGS. 1, 2 and 3 respectively but describing the details of the second tubular body segment (18). The second tubular body segment (18) has an inner surface (60), an outer surface (62), an open back end (64) and an open front end (66). Open back end (64) has edge (68) and open front end (66) has edge (70). The second tubular body further comprises a first flange (72) depending radially outwardly from the open back end (64) edge (68) and a second flange (74) depending radially inwardly from the open front end (66) edge (70). The first flange (72) has a rear surface (76), a front surface (78) and a bearing surface (80). The second flange (74) has a front surface (82), a rear surface (84) and a bearing surface (86). The second tubular body segment (18) has an inner diameter (88) and an outer diameter (90) creating a wall thickness (92). The second tubular body segment (18) further comprises apertures (94) mounted radially about the circumference thereof. As further described below these apertures act as cooling air intake ports.

Figure 7:
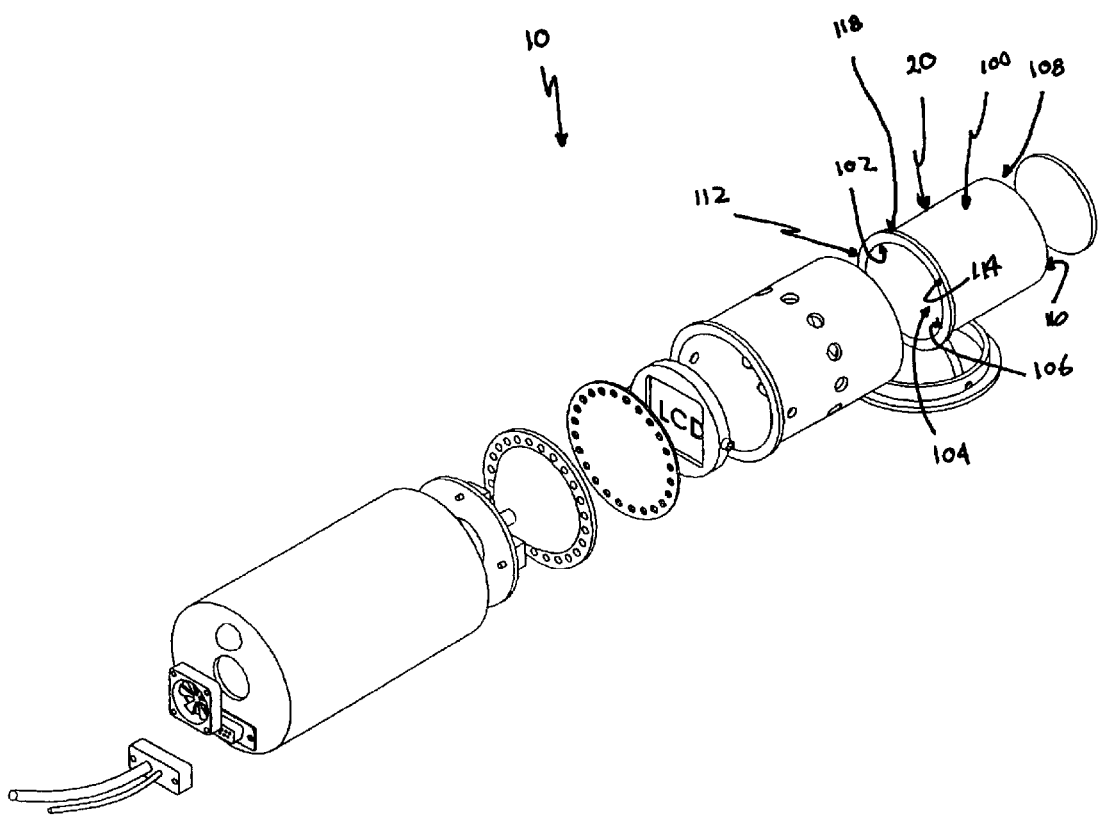
FIG. 7 is an expanded perspective rear view of the invention identifying the major features of the third tubular body segment.
Figure 8:
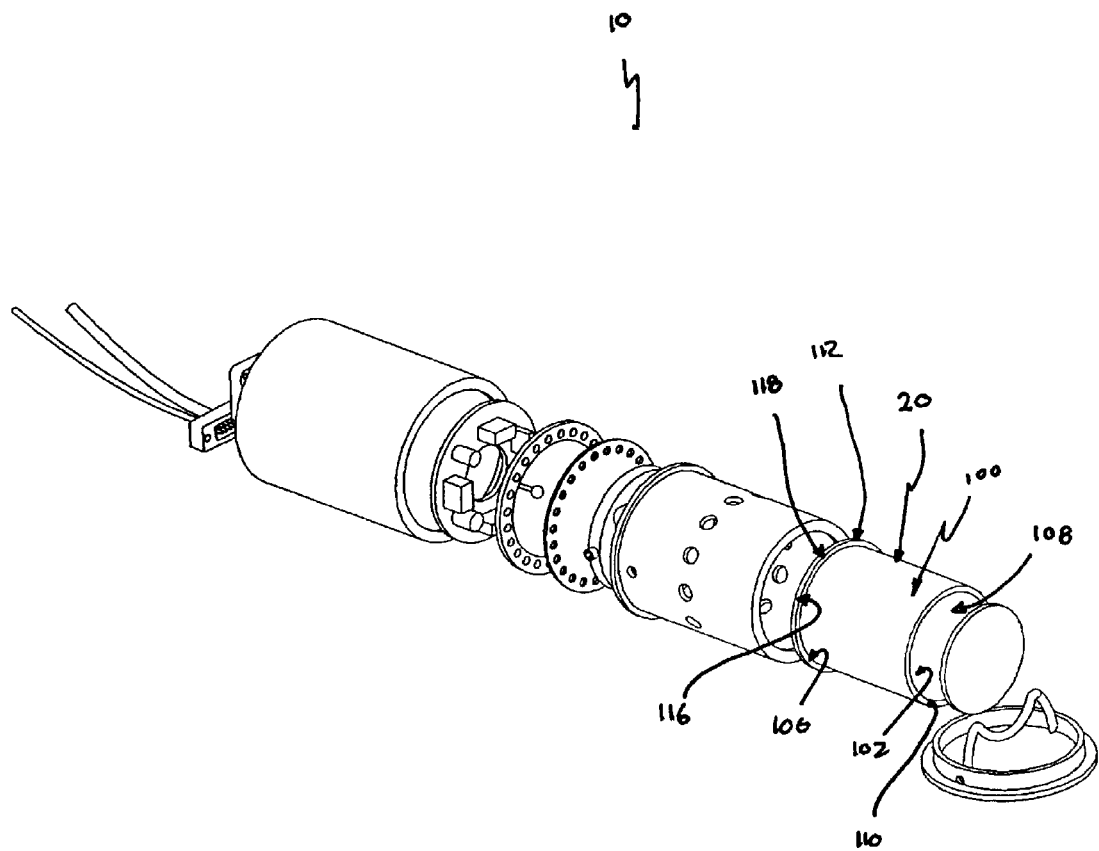
FIG. 8 is an expanded perspective front view of the invention identifying the major features of the third tubular body segment.
Figure 9:
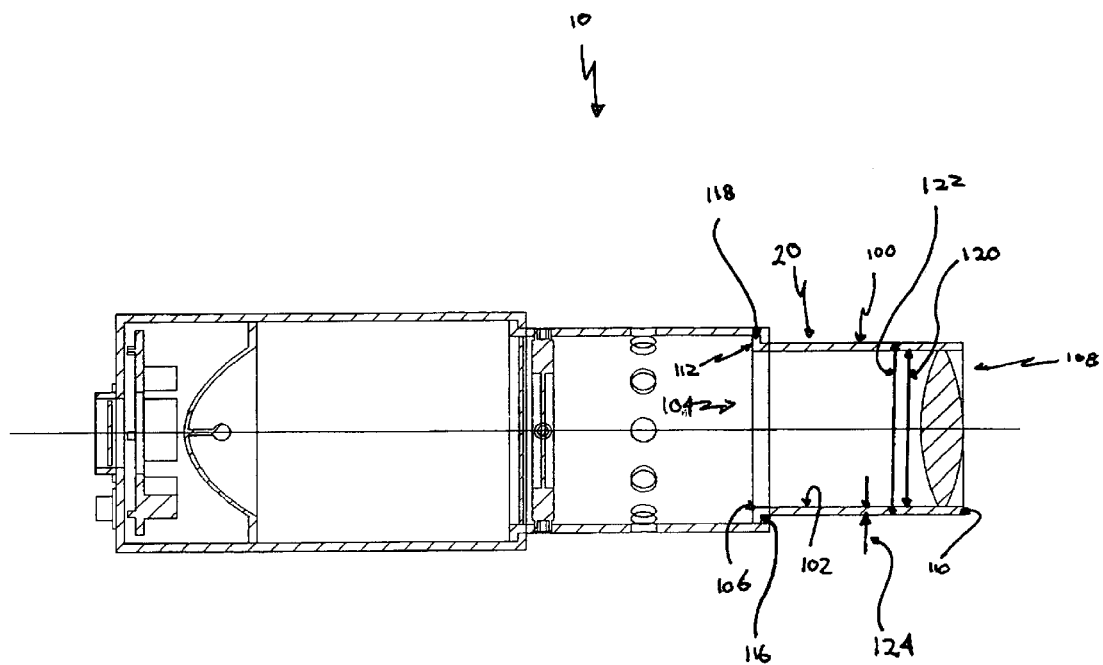
FIG. 9 is a sectional side view of the invention identifying the major features of the third tubular body member.

Referring to FIGS. 7, 8 and 9 the invention (10) further comprises a third tubular body segment (20). The third tubular body segment (20) has an outer surface (100), an inner surface (102), an open back end (104) having an edge (106) and an open front end (108) having an edge (110). The third body segment (20) further comprises a flange (112) depending radially outwards from the open back end (104) edge (106). The flange has an inner surface (114), an outer surface (116) and a bearing surface (118). The third body segment (20) has an inner diameter (120) and an outer diameter (122) creating a wall thickness (124).

Telescopically Expanding and Collapsing the Projector

Figure 10:
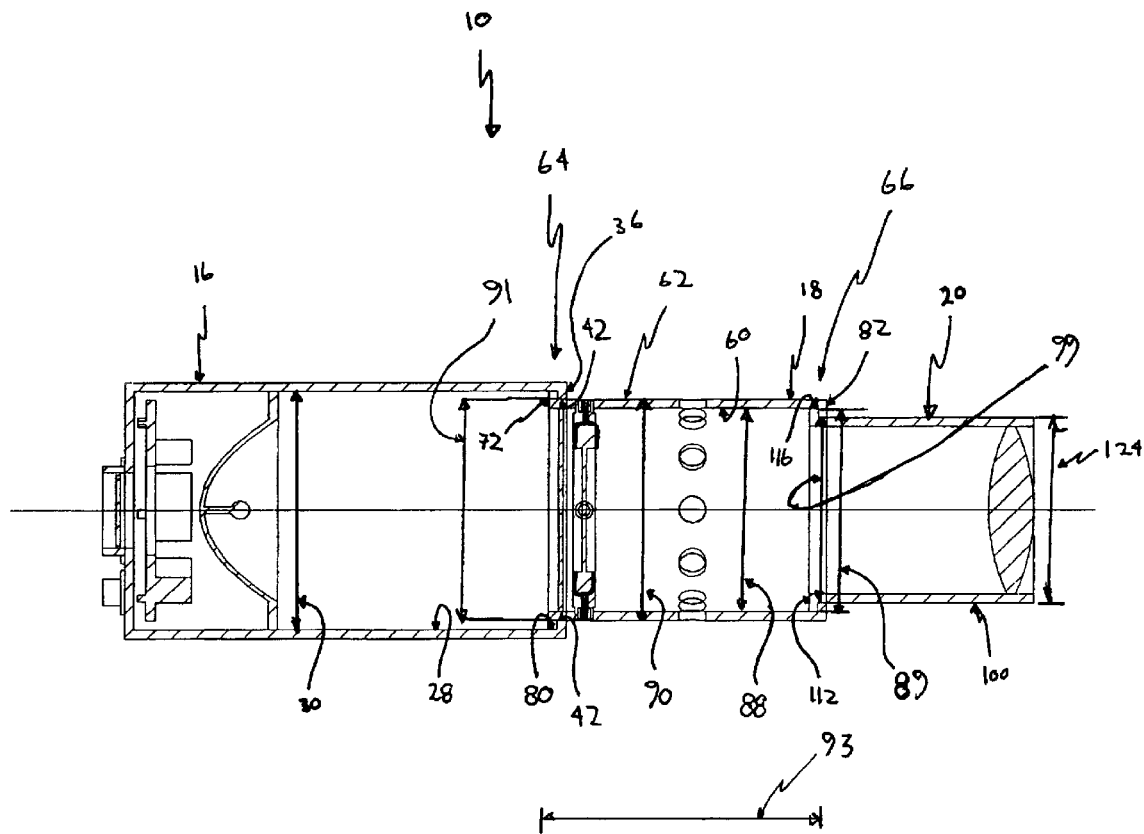
FIG. 10 is a section side view of the invention in its expanded operating configuration identifying major features of the invention.
Figure 11:
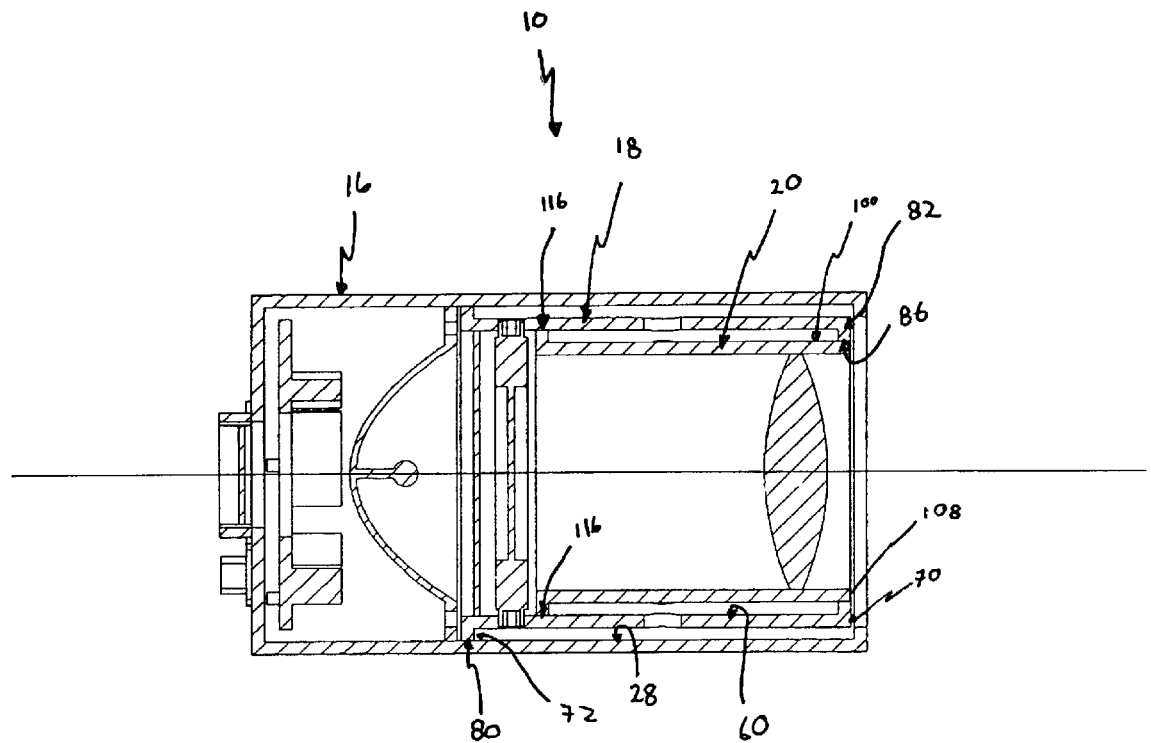
FIG. 11 is a sectional side view of the invention in its stowed configuration identifying the major features of the invention.

Referring now to FIGS. 10 and 11 there is shown the same embodiment of the invention (10) in a telescopically expanded configuration (FIG. 10) and the invention (10) in a telescopically collapsed configuration (FIG. 11). The manner in which the second tubular segment (18) slides within the first tubular segment (16) is explained. The inner diameter (30) of the first tubular segment (16) is slightly greater than the outer diameter (90) of the second tubular segment so that the bearing surface (80) of flange (72) and the inside surface (28) of the first tube segment (16) are in a tight and sliding frictional engagement. The outer diameter (90) of the second tubular segment (18) and the inside diameter (91) of flange (36) are adapted so that the bearing surface (42) of flange (36) of the first tubular segment (16) is in sliding frictional engagement with the outer surface (62) of the second tubular segment (18). The result is that the second segment (18) is permitted to slide controllably within the first segment (16). As the second segment (18) slides into and out of the first segment (16), the length (93) of the second segment (18) is fully supported at end (64) by the cooperative action of flange (72) bearing surface (80) and the inner surface (28) of the first tubular segment (16) and at end (66) by the cooperative action of the bearing surface (42) of the flange (36) against the outer surface (62) of second segment (18). The frictional fit between the first segment (16) and the second segment (18) is such that hand forces are able to easily move the segments relative to each other but when the hand forces are removed the first (16) and second (18) segments will remain in position relative to each other. This maintains the integrity of the optical pathway more fully described below. Referring to FIG. 11, once the second segment (18) is fully inserted into the first segment (16) the contact between the bearing surface (80) of flange (72) against the inner surface (28) of the first segment (16) is sufficient to maintain the second segment (18) co-axial with the first segment (16) even though the edge (70) of the second segment (18) is unsupported.

Still referring to FIGS. 10 and 11 the manner in which the third segment (20) slides within the second segment (18) is explained. The inner diameter (88) of the second segment (18) is slightly greater than the outer diameter (89) of flange (112) so that the bearing surface (116) of flange (112) is in tight frictional engagement with the inner surface (60) of the second segment (18). The inside diameter (99) of flange (82) is slightly greater than the outside diameter (124) of the third segment (20) so that the bearing surface (86) of the flange (82) is in tight frictional sliding contact with the outer surface (100) of third segment (20). As the third segment (20) is moved into and out of second segment (18) the sliding frictional engagement between bearing surface (116) and inside surface (60) and between bearing surface (86) and outside surface (100) provides support for the third segment (20) so that it remains co-axial with the second segment (18) whether fully extended as shown in FIG. 10 or fully collapsed as shown in FIG. 11. As shown in FIG. 11, once the third segment (20) is fully inserted into the second segment (18) the bearing surface (116) on surface (60) and bearing surface (86) on surface (100) is sufficient to maintain co-axiality.

The tubular segments are constructed from a suitable thermoplastic material that is moldable, resilient and lightweight.

The Optical Pathway

Figure 12:
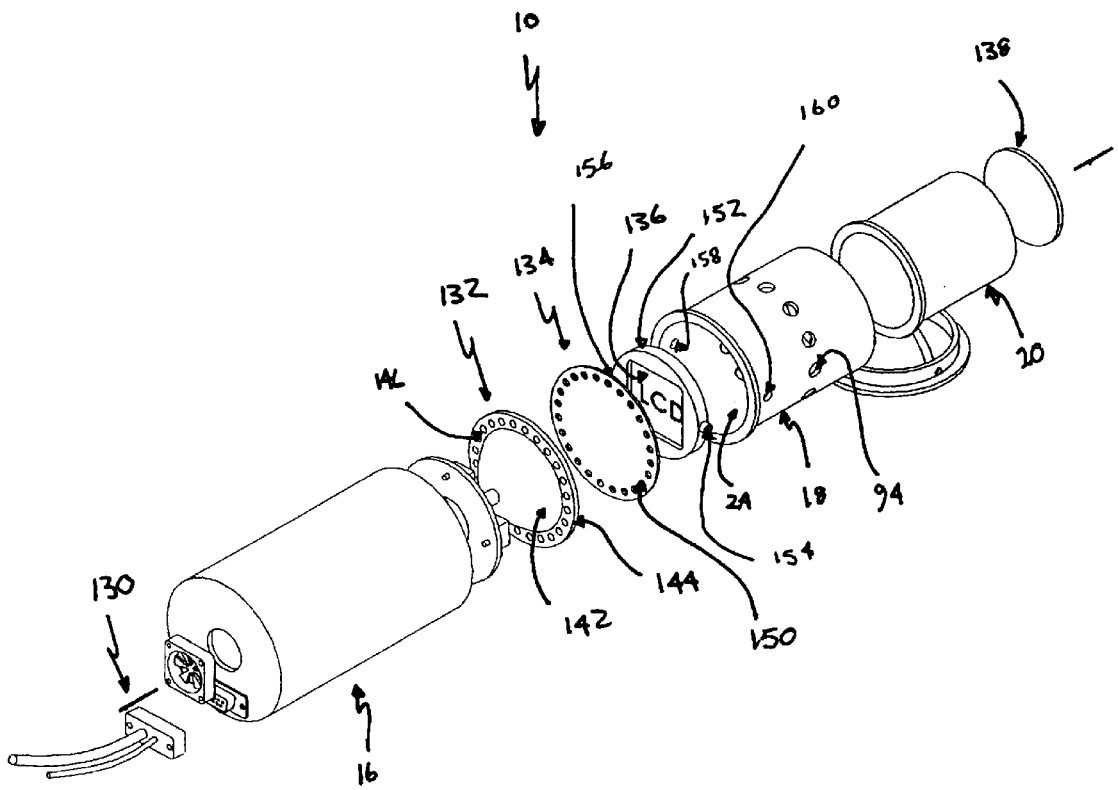
FIG. 12 is an expanded perspective rear view of the invention identifying the elements of the optical pathway.
Figure 13:
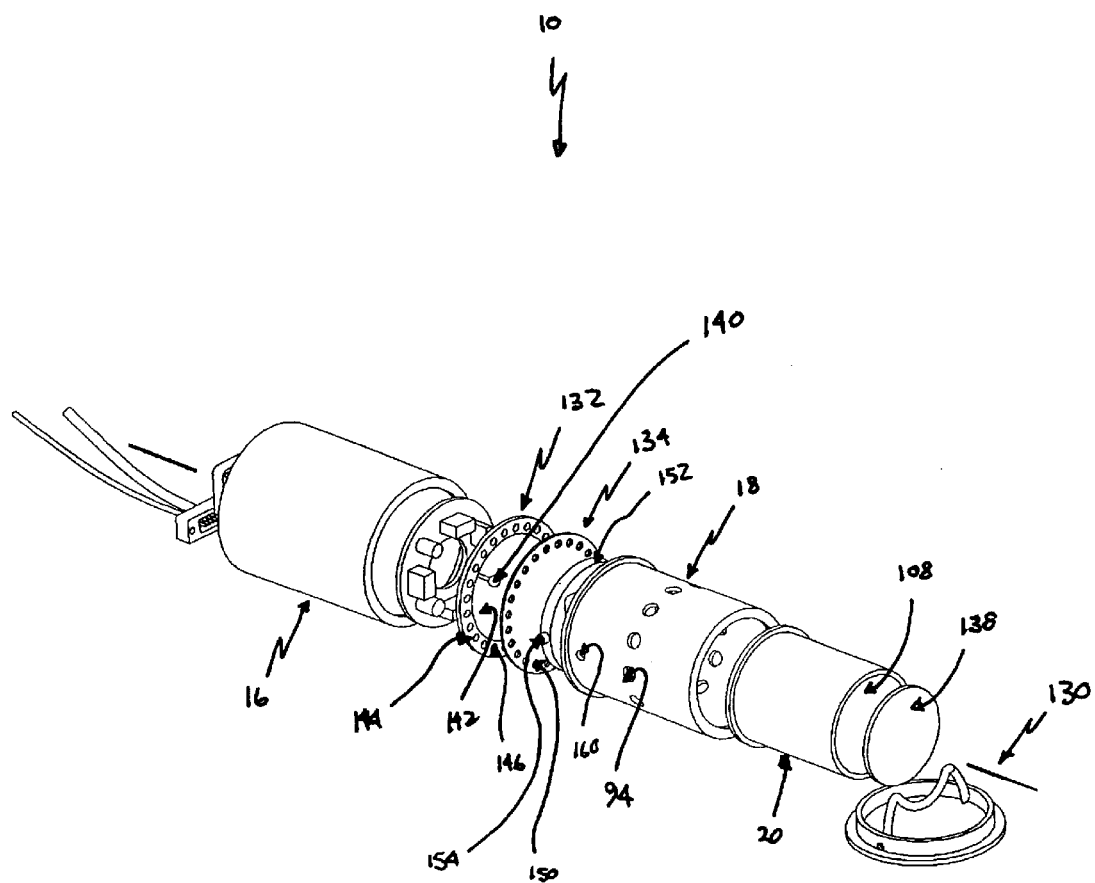
FIG. 13 is an expanded perspective front view of the invention identifying the elements of the optical pathway.
Figure 14:
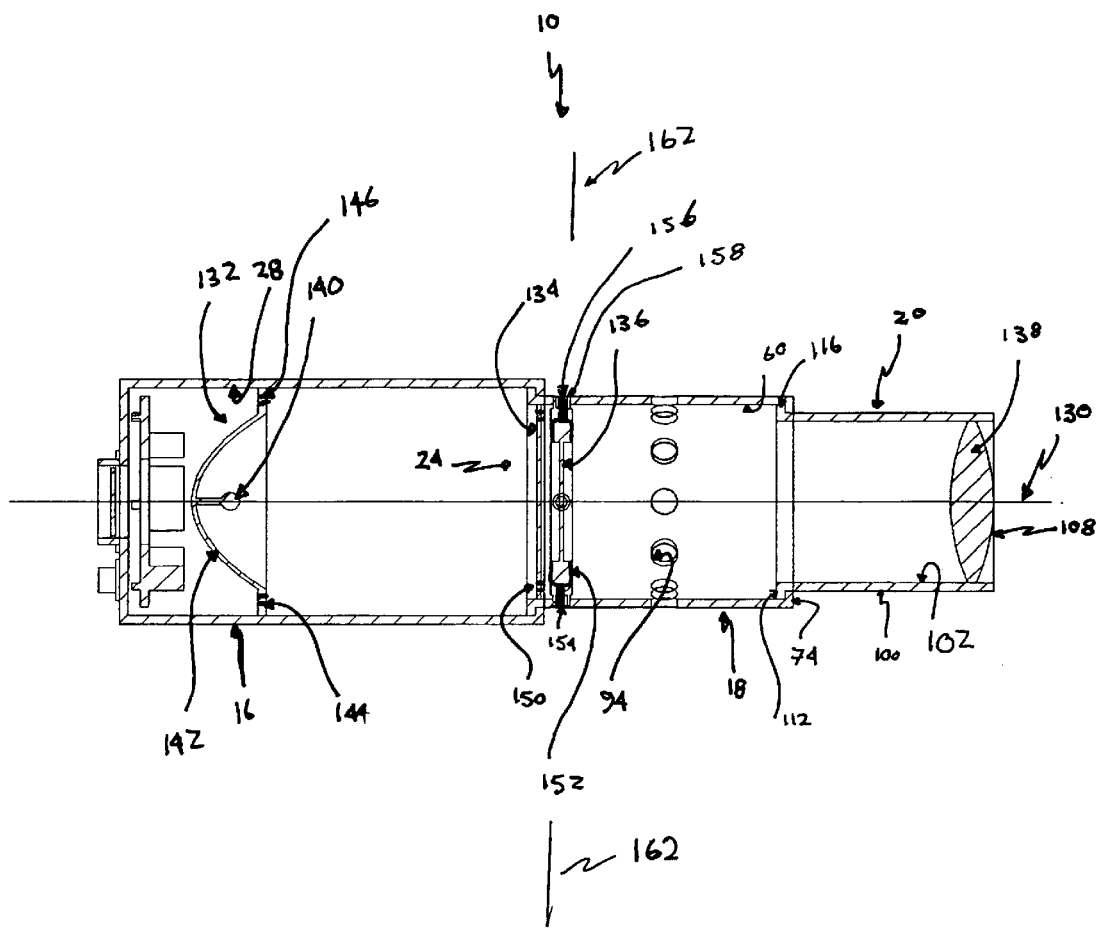
FIG. 14 is a sectional side view of the invention in its expanded operating configuration identifying the elements of the optical pathway.

Referring now to FIGS. 12, 13 and 14 there is shown one embodiment of the invention (10) and the location and relationship between the various elements of the optical pathway. The optical pathway is defined by axis (130) which also represents the axis of the first (16), second (18) and third (20) tubular body segments. The elements of the optical pathway (130) comprise a light source (132) mounted within first tubular body segment (16); a diffusing filter (134) mounted over the first end (24) of the second tubular body segment (18); an imaging element (136) also mounted within the second tubular body segment (18) and in front of the diffusing element (134); and, a focusing element (138) mounted within the second end (108) of the third tubular body segment (20).

Still referring to FIGS. 12, 13 and 14 the light source (132) comprises bulb (140) mounted within a parabolic reflector (142). The parabolic reflector (142) is mounted to mounting ring (144) that is in turn fixed in position to the inside surface (28) of the first tubular body segment (16). The mounting ring (144) is radially apertured (146) to permit cooling air flow as described below. In other embodiments of the invention the light source may be typical projector bulb such as a filamented halon or xenon bulb or an arc lamp. However, this invention also contemplates the use of much cooler light sources such as fluorescent light sources and light emitting diodes. The use of such cooler light sources could render unnecessary the forced air cooling system and rely instead on simple convection currents within the body of the projector venting heat by way of apertures (94) in the second segment (18). The diffusing element (134) diffuses the light from the light source (132) to ensure that the imaging element (136) is evenly illuminated. The diffusing element (134) is circular and mounted to the end (24) of the second segment (18). Such elements are well known to persons skilled in the art. The diffusing element is apertured (150) radially about its outer diameter to permit cooling air flow. The imaging element (136) is mounted within a frame (152). Frame (152) includes a pair of pins (154) and (156) that are mounted within apertures (158) and (160) in the second tubular body segment (18). The pins permit a limited pivoting action of the frame (152) about its lateral axis (162) for keystone correction. The frame may be moved manually by way of a knob attached to the free end of either or both pins or in alternative embodiments the frame may be moved by servomechanisms that are remotely controlled. The imaging element (136) is preferably a fully colour capable single LCD. However, this invention also contemplates the use of imaging devices such as multiple element LCDs, micro electrical mechanical systems (MEMS), light valves, suspended particle devices (SPDs), polysilicon displays, liquid crystal on silicon displays (LCOS) and interferometric modulators (IMods). Focusing lens (138) is attached to the inside surface (102) of third tubular body segment (20). As shown in FIG. 14, the third segment (20) acts as a focusing tube that is capable of fine adjustment by hand forces in or out of the second tubular segment (18) to focus an image on a distant projection screen. In one embodiment of the invention, controlled adjustment of the focusing tube in and out of the second segment is accomplished by the frictional engagement between the bearing surfaces of the flanges (74) and (112) and the inner (60) and outer surfaces (100) of the second and third tubular body segments respectively as previously discussed above. In alternative embodiments the bearing surface (116) of flange (112) is threadably engaged with the inner surface (60) of the second tubular body segment (18). In this embodiment the focusing tube is lengthened or shortened by rotating the tube into and out of the second segment. In yet another embodiment, the focusing tube is slideably moveable with respect to the second body segment by way of a rack and pinion gear system whereby the rack resides on the outside surface of the third body segment and the cooperating pinion gear is mounted within second tubular body segment. The pinion may be manually rotated or the pinion may be operatively connected to electric servo-mechanisms operable remotely. Such remote focusing means are well known in the art and can be readily adapted to the invention.

Figure 15:
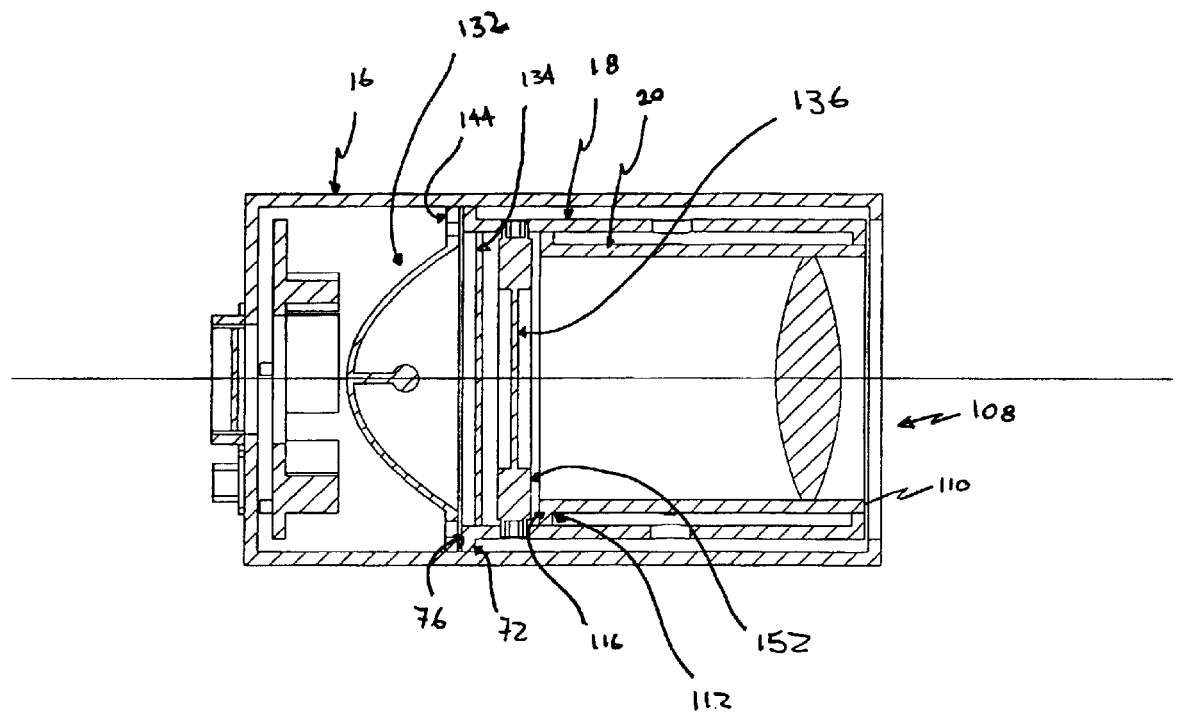
FIG. 15 is a sectional side view of the invention in its stowed configuration identifying the elements of the optical pathway.

Referring now to FIG. 15 there is shown the manner in which the elements of the optical pathway are arranged when the projector is in its telescopically collapsed configuration for stowage. The second (18) segment slides fully into the first (16) segment and the third segment (20) slides fully into the second (18) segment. In the telescopically collapsed configuration, surface (76) of flange (72) abuts against the ring (144) of the light source (132). Diffusion element (134)

and imaging element (136) retain their positional relationship with respect to each other within the second tubular body segment (18). When the second tubular body segment (18) is collapsed within the first segment (16) the diffusion element is in close proximity to the projection light source (132). When the third tubular body segment (20) is collapsed within the second segment (18) surface (116) of flange (112) abuts against the frame (152) holding imaging element (136). Edge (110) of end (108) of third segment (20) is totally within first body segment (16). This will permit the placement of the end cap on to the projector as more fully described below.

Therefore, it is apparent from the above discussion and referenced drawings that my invention is advantageously capable of being collapsed and stored having a very small footprint for stowage compared to prior art projectors.

The Cooling System

Figure 16:
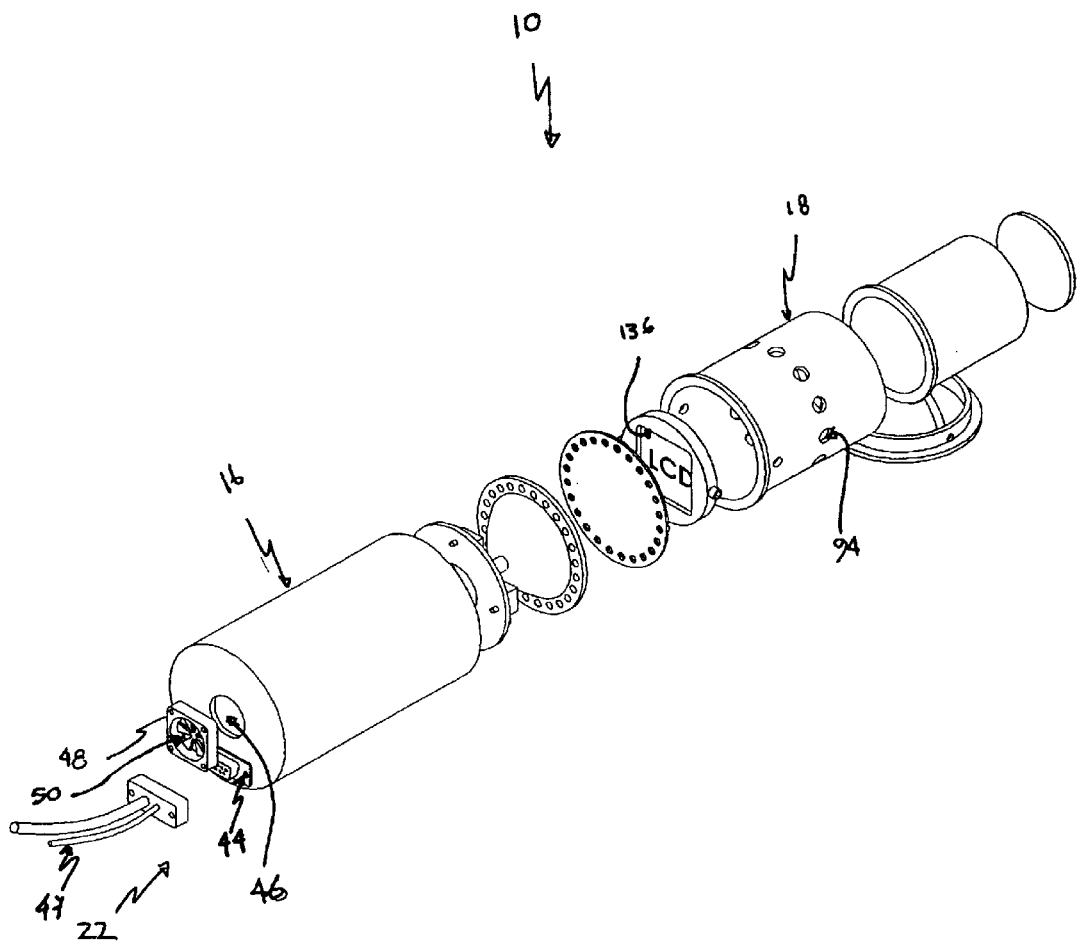
FIG. 16 is an expanded perspective rear view of the invention identifying the major elements of the cooling system.
Figure 17:
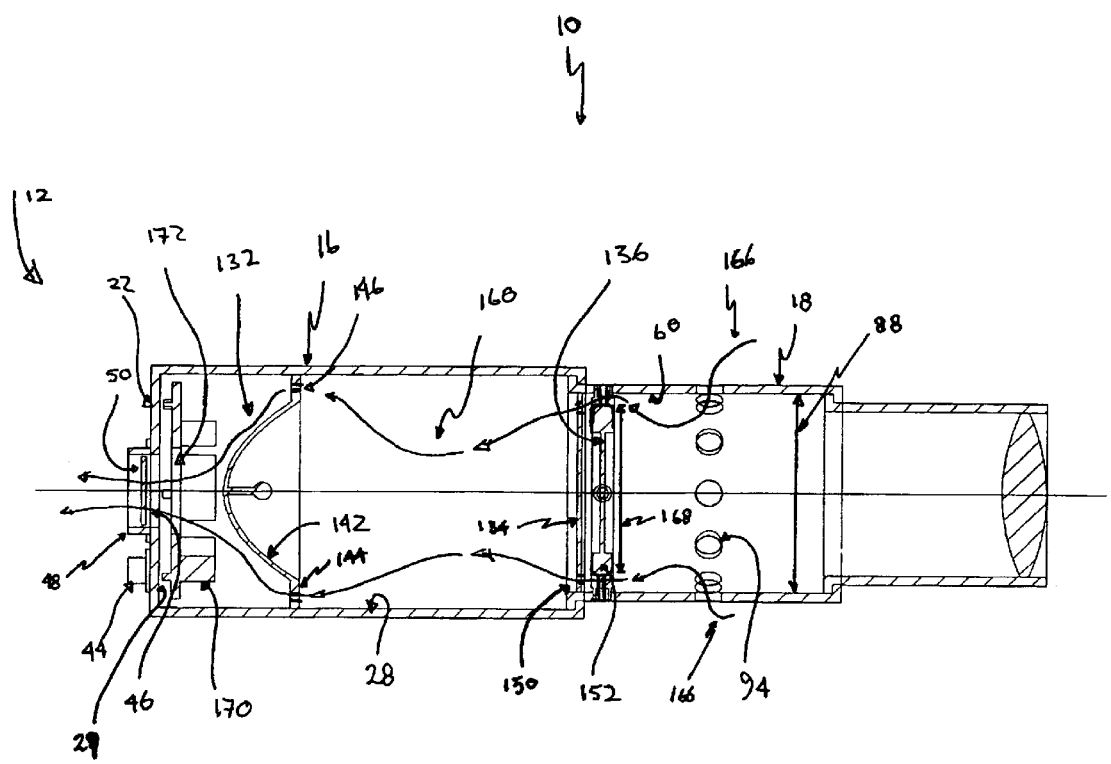
FIG. 17 is a sectional side view of the invention in its expanded operating configuration identifying details of the cooling system.

The light source of the projector will generate heat that will have to be dissipated to avoid damage to the body of the projectors and its internal elements. Referring to FIGS. 16 and 17 there is shown the various elements of the cooling system of one embodiment of the invention (10). Fan housing (48) supports the electric fan/motor assembly (50) that is mounted over aperture (46) in the back end (22) of the first tubular body segment (16). Aperture (46) operates in cooperation with the electric fan/motor assembly (50) to exhaust heated air from the body of the projector. The intake of cooling air is performed through the apertures (94) around the circumference of the second tubular element (18). When the projector is in its extended and operating configuration as shown in FIG. 17, a heat sink is formed. The heat sink is in the form of air-filled void (160). The air-filled void (160) is capable of absorbing heat from the light source (132) to prevent damage to the projector. In one embodiment of the invention the first tubular body segment is equipped with heat dissipating fins thereby increasing the surface area of the first tubular body segment over which heat can be dissipated by conduction through the first tubular body segment and convection currents around the outer surface of the body. While the projector is operating, heated air in the void (160) is constantly replaced by fresh air from the air intake apertures (94). In one embodiment of the invention, the fan/motor (50) combination will commence operating as soon as the light source is switched on. In another embodiment of the invention, the fan/motor combination (50) will commence operating when the body of the projector is extended to its operating configuration. In this embodiment, a cooling air flow will be established before the light source is turned on.

Referring now to FIG. 17, the cooling air flow pathways of the operating projector is described. With the fan/motor combination (50) operating, fresh cooling (166) air is drawn in through apertures (94). The diameter (168) of the frame (152) holding the imaging element (136) is less than the inner diameter (88) of the second tubular body segment (18). This permits movement of the frame (152) for keystone correction and permits the flow of cooling air between the outer circumference of the frame (152) and the inner surface (60) of the second tubular body segment (18). Air is then drawn around the diffusion element (134) and through the apertures (150) within the outer circumference of the diffusion element. The cooling air is then drawn into the heat sink void (160) wherein it replaces heated air already in the void. The heated air is drawn from the void (160) by the fan/motor combination (50) through the apertures (146) in the outer mounting ring (144) of the light source (132). Air is drawn over the parabolic reflector (142) for further cooling of the light source. As described below, the invention includes a circuit board (170) that has an aperture (172) through its centre. This permits air to flow around the circuit board to cool its heat sensitive components. The heated air this then exhausted through the exhaust port (46).

Referring still to FIG. 17 and comparing it to FIG. 15, it can be seen that this invention advantageously makes use of the air-filled void (160) as stowage space for the second (18) and third (20) body segments when the projector is not in use. The permits the reduction in size of the stowage footprint of the invention that is significant over known projectors.

The Control System

Referring to FIGS. 16 and 17 this embodiment of the invention (10) includes control circuits adapted to operate and control the electrical and mechanical components of the projector. The control circuits of projectors are well known and adaptable to this invention. However, in this invention, the control circuits are mounted to a circular circuit board (170) that has an aperture (172) in its middle. The circuit board (170) is mounted to the inside surface (29) of the closed back surface (22) of the first tubular body segment (16). The control circuits are connected to a source of power and digital images by way of receptacle (44) and cable (47). Included in the control circuitry are image conversion means to convert an image received digitally from a source of images such as a computer to signals receivable by the imaging device (136) to produce images for projection on a distant screen. In one embodiment of the invention, the circuitry includes a digital processor and memory device either separately or in combination mounted to the circuit board. In this embodiment, the images for projection are retrievably stored in the memory device and accessible by the digital processor. The digital processor then retrieves the images for projection and converts them to signals receivable by the imaging device for projection onto a distant screen. In this embodiment, the projector would be able to project a programmed series of images without being attached to an external source of images such as a computer or personal computing device like a PalmPilot® or similar device. In a further embodiment of the invention, remote control means are provided so that the projector can be operated by an operator remotely as might be required during a presentation. The remote control means might be an infrared device or a radio device included in the circuitry of the projector. The projector can also include a microphone and speaker that can be used for voice control of the projector or to provide for an audio-visual presentation.

Figure 18:
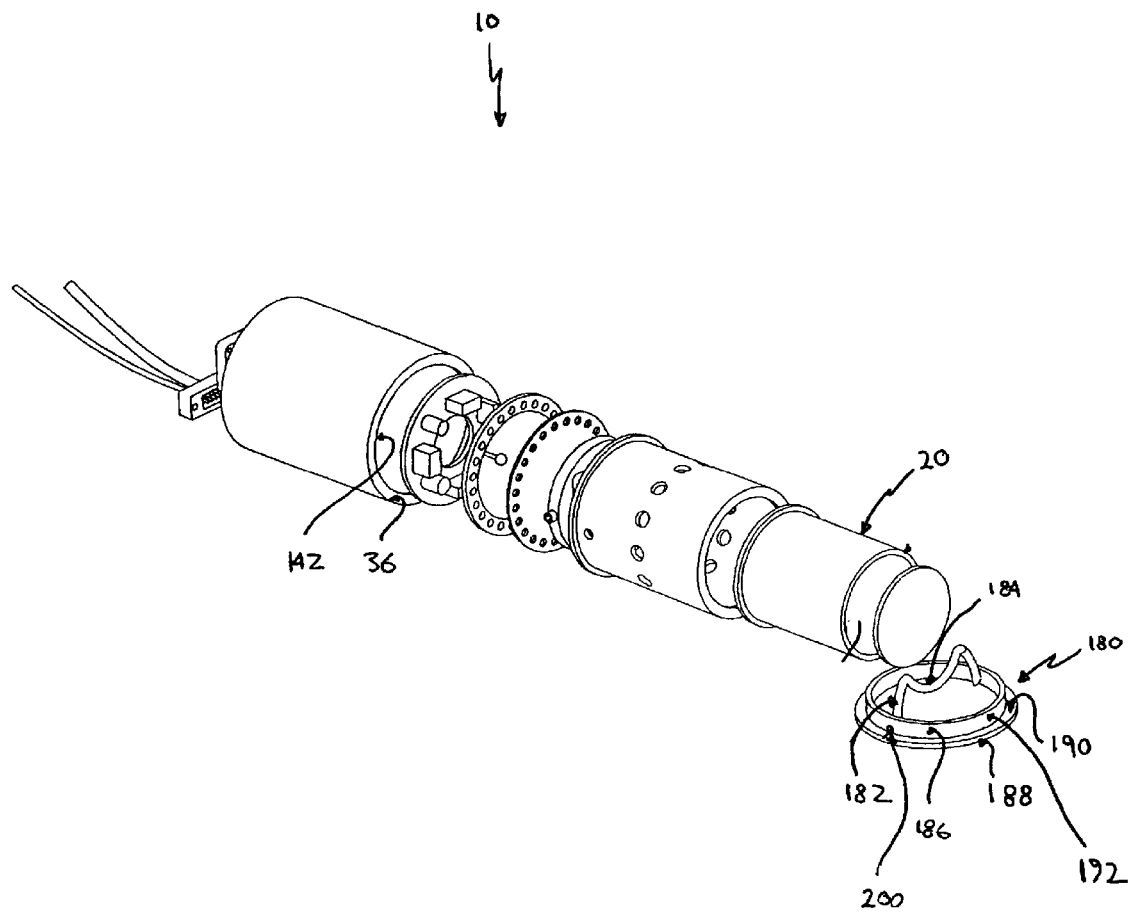
FIG. 18 is an expanded perspective front view of the invention identifying details of the end cap.

Referring to FIG. 18, the invention (10) includes a projector body end cap (180) having a support member (182). The support member (182) has a yoke portion (184) that is adapted in shape to hold the tubular third body segment (20) in a stable configuration while operationally deployed. The end cap further comprises a flange (188) having an inner surface (190) and a neck member (186) depending upwards from the flange (188). Neck (186) has an outer surface (192). When the projector is in its telescopically collapsed configuration as shown, for example, in FIG. 11, the end cap is placed over the end of the projector so that the outer surface (192) of the neck member (186) is in frictional contact with the bearing surface (42) of flange (36) of the first tubular body segment (16). The surface (190) of flange (188) will abut against the outer surface (36) of flange (42) providing a dust and moisture resistant closure to the projector when stowed. The support member (182) is pinned (200) to the neck member (192) and folds out of the way into the cap for stowage.

Figure 19:
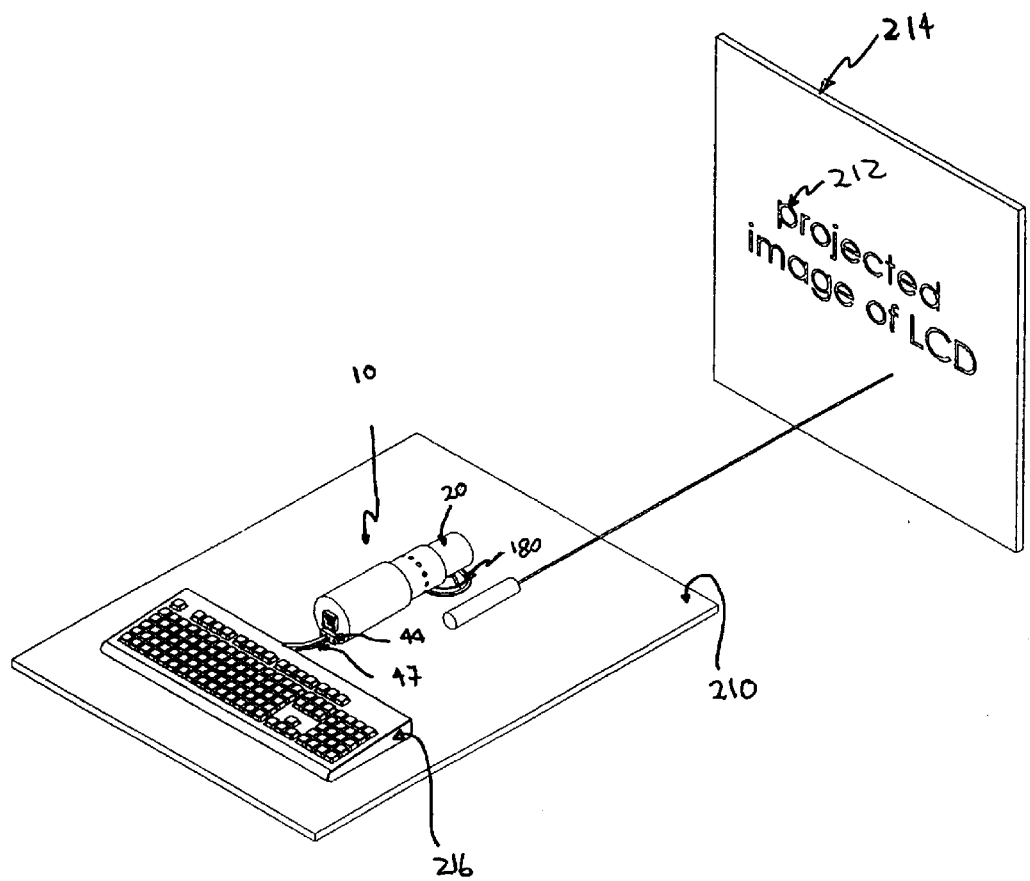
FIG. 19 is a view of the invention in operation.

Referring to FIG. 19 there is shown an embodiment of the invention (10) in an extended operation position placed upon a platform (210) and projecting images (212) on a distant screen (214). A keyboard (216) is shown connected to the invention (10) by way of cable (47) and receptacle (44). End cap (180) is shown supporting the third tubular segment (20) and keeping the invention supported and stable during projection. In this embodiment, the invention would include a digital processor and memory device embedded into the circuit board. The memory device holds an image processing software such as PowerPoint® and as well as a series of pre-created images. The key board (216) can be used to access the software and stored images for projection. Alternatively, the keyboard can be used to create a presentation using the invention as a real-time projector such as might be used in teaching environments. Advantageously, there is no need to connect the projector to an external memory or data processing device.

Although this description contains much specificity, these should not be construed as limiting the scope of the invention by merely providing illustrations of some of the embodiment of the invention. Thus the scope of the invention should be determined by the appended claims and their legal equivalents rather than by the examples given.

What is claimed is:

1. A telescopically collapsible image projector having a segmented tubular body comprising:
    a. a first tubular body segment;
    b. a second tubular body segment co-axially mounted to said first tubular body segment and adapted for sliding concentric placement within the first tubular body segment;
    c. a third tubular body segment co-axially mounted to said second body segment and adapted for sliding concentric placement within the second tubular body segment,
    wherein said image projector has:
        d. a first stowed configuration in which the first, second and third tubular body segments are co-axially and telescopically collapsed within each other in concentric placement; and,
        e. a second operating configuration in which the first, second and third tubular body segments are co-axially deployed thereby forming:
            f. a rigid optical pathway; and,
            g. a heat sink.

2. The image projector of claim 1, further comprising:
    a. means for supporting the first tubular body segment, second tubular body segment and third tubular body segment co-axially in said second operating configuration;
    b. means for projecting an image on to a distant projection screen;
    c. means for cooling the image projector utilizing said heat sink; and,
    d. means for controlling the image projector.

3. The image projector of claim 2, wherein the first tubular body segment comprises:
    a. a closed back end;
    b. an open front end having an edge;
    c. an outer surface having an outer diameter; and,
    d. an inner surface having an inner diameter
    wherein said closed back end, said open front end, said inner surface and said outer surface act together to form a void, said void adapted to receive the second tubular body segment and the third tubular body segment in respective concentric placement.

4. The image projector of claim 3, wherein, the first tubular body segment further includes a flange depending radially inwards from said open front end edge, said flange having a bearing surface, a rear surface and a front surface.

5. The image projector of claim 4, wherein the second tubular body segment comprises:
    a. an open back end having an edge;
    b. an open front end having an edge;
    c. a length;
    d. an outer surface having an outer diameter; and,
    e. an inner surface having an inner diameter,
    wherein said open back end, said open front end, said outer surface and said inner surface act together to define a lumen, said lumen adapted to receive the third tubular body segment in concentric placement.

6. The image projector of claim 5, wherein the second tubular body segment furthering includes:
    a. a first flange depending radially outwards from said open back end edge, said flange having a front surface, a back surface and a bearing surface; and,
    b. a second flange depending radially inwards from said front end edge, said second flange having a front surface, a back surface and a bearing surface.

7. The image projector as claimed in claim 6, wherein the second tubular body segment further includes:
    a. a plurality of apertures spaced radially about the outer surface thereof; and,
    b. a first mounting hole and a second mounting hole distally positioned at the open first end thereof, wherein said first mounting hole and said second mounting hole are positioned opposite each other.

8. The image projector of claim 7, wherein the third tubular body segment comprises:
    a. an open a back end having an edge;
    b. an open front end having an edge;
    c. a length;
    d. an outer surface having an outer diameter; and,
    e. an inner surface having an inner diameter,
    wherein said open back end, said open front end, said outer surface and said inner surface acting together to define a lumen.

9. The image projector of claim 8, wherein the third tubular body segment further includes a flange depending radially outwards from said first open end edge, said flange having a back surface, a front surface and a bearing surface.

10. The image projector as claimed in claim 9, wherein said means for supporting the first tubular body segment, second tubular body segment and third tubular body segment co-axially in said second operating configuration comprises:
    a. means for supporting the second tubular body segment within the first tubular body segment, said means comprising:
        i. a first support comprising said bearing surface of the second tubular body segment first flange, wherein the bearing surface is in sliding frictional contact with the inner surface of the first tubular body segment; and,
        ii. a second support comprising said bearing surface of said first tubular body segment flange wherein, the bearing surface is in sliding frictional contact with the outer surface of the second tubular body segment;
    b. means for supporting the third tubular body within the second tubular body segment, said means comprising:

i. a third support comprising said bearing surface of said second tubular body segment second flange, wherein the bearing surface is in sliding frictional contact with the outer surface of the third tubular member; and,
ii. a fourth support comprising said third tubular body segment flange bearing surface in sliding frictional contact with the inside surface of the second tubular body segment;

wherein said first, second, third and fourth supports permit telescopic co-axial sliding movement between the second tubular body segment and the first tubular segment and co-axial sliding movement between the second tubular body segment and the third tubular body segment so that the imaging projector body segments may be slidingly moved from said first stowed configuration to said second operating configuration thereby forming a rigid optical pathway, and further wherein the tubular body segments may be slidingly moved from the second operating configuration to the first stowed configuration.

11. The image projector as claimed in claim 10, wherein means for projecting an image on to a distant projection screen comprises:
a. the rigid optical pathway defined by the axis of the first tubular body segment, second tubular body segment and third tubular body segment coaxially aligned in the second operating configuration;
b. a projection light source positioned on the optical pathway for illuminating an image for projection;
c. a diffusing filter positioned adjacent to said projection light source on the optical pathway for diffusing light from the projection light source;
d. an imaging element positioned on the optical pathway adjacent to the diffusing filter for creating said image for projection; and,
e. image focusing means for focusing the image for projection onto said distant projection screen.

12. The image projector as claimed in claim 11, wherein the projection light source comprises a device selected from the group consisting of filamented bulbs, arc lamps, fluorescent lamps, and light emitting diodes.

13. The image projector as claimed in claim 12, wherein the projection light source is mounted within a parabolic mirror, said mirror mounted to a circular frame, said frame mounted to the inside surface of the first tubular body segment, wherein the frame further comprises a plurality of apertures set radially around the distal periphery thereof.

14. The image projector of claim 13, wherein said diffusing element is mounted between the projector light source and said imaging element positionally within the first open end of the second tubular body segment, and wherein the diffusing element further comprises a plurality of apertures set radially around the distal periphery thereof.

15. The image projector of claim 14, wherein the imaging element is mounted within a frame, said frame mounted to the inside surface of the second tubular body segment by two co-axial pins, each of said pins mounted on opposite sides of the frame and adapted for insertion and rotation within said first mounting hole and said second mounting hole respectively so that the frame and imaging means are together capable of pivoting movement for keystone correction of the projected image.

16. The image projector of claim 15, wherein the frame has an outside diameter less than the inside diameter of the second tubular body segment so that an annulus is formed permitting air flow through said annulus and between the frame and the inside surface of the second tubular body segment.

17. The image projector as claimed in claim 16, wherein the imaging element is a fully colour capable single liquid crystal display.

18. The image projector as claimed in claim 17, wherein the imaging element is a device selected from the group consisting of: a fully colour capable single liquid crystal display, a plurality of monochromatic element liquid crystal displays, micro electrical mechanical systems, light valves, suspended particle devices, polysilicon displays, liquid crystal on silicon displays, and interferometric modulators.

19. The image projector as claimed in claim 18, wherein said image focusing means comprises a focusing tube, said focusing tube comprising a focusing lens and the third tubular body segment acting in combination, wherein said focusing lens is mounted within the second open end of the third tubular body segment, and wherein the focusing lens is co-axial with the optical pathway, so that the focusing tube is capable of axial movement towards and away from the imaging element by frictionally sliding the focusing tube in and out of the second tubular body segment thereby applying focusing correction to the projected image.

20. The image projector as claimed in claim 19, wherein the focusing tube is threadably mounted within the second tubular body segment so that the focusing tube may be moved into and out of the second tubular body segment by rotating the focusing tube about its axis in a clockwise and counterclockwise direction respectively.

21. The image projector as claimed in claim 20, wherein the focusing tube is slideably moveable into and out of the second tubular body segment using a system comprising a rack and pinion wherein said rack is fixed to the outside surface of the focusing tube and operated in meshed cooperation with said pinion fixed to the inside surface of the second tubular body segment.

22. The image projector of claim 21, where, in the first stowed configuration, the length of the second tubular body segment is positioned concentrically within the first tubular body segment and, where, in the length of the third tubular body segment is positioned concentrically within the second tubular body segment, so that said inside surface of the second tubular body first flange abuts against said circular frame of the projection light source; and wherein the inside surface of the third tubular body segment flange abuts the imaging element frame.

23. The image projector as claimed in claim 22, wherein means for cooling the image projector comprises a cooling system comprising:
a. the heat sink adjacent to the projector light source for absorbing heat from the projector light source;
b. an aperture in the centre of the closed end of the first tubular body segment, said aperture adapted for exhausting heated air;
c. a plurality of apertures radially displaced about second tubular body segment for drawing cooling air into the image projector; and,
d. a fan housing support mounted over said aperture, said support adapted for mounting an electric fan/motor assembly capable of drawing cooling air from said plurality of apertures in the second tubular body segment and exhausting heated air from closed end aperture of the first tubular body segment.

24. The image projector as claimed in claim 23, wherein the heat sink comprises an air-filled void adjacent to the projector light source.

25. The image projector as claimed in claim 24, wherein said air-filled void is formed when the segmented tubular body of the image projector is extended to its second operating configuration.

26. The image projector of claim 25, wherein when the image projector is in its stowed configuration, the air-filled void becomes a storage chamber for the second tubular body segment and the third tubular body segment concentrically positioned therein, thereby creating a small stowage foot print for the image projector.

27. The image projector as claimed in claim 26, wherein said control means comprises a plurality of control circuits adapted to operate and control the electrical and mechanical components of the projector, wherein said plurality of control circuits is mounted to a circular circuit board that is apertured at its centre for cooling air flow, and wherein the plurality of control circuits includes digital image conversion means, memory means, digital processing means, voice actuation and control means, audio-visual presentation means and means for remote operation the image projector.

28. The projector as claimed in claim 27, further including a circular body cap adapted to fit over the end of the projector when the projector is in its stowed configuration, said cap further including a supporting member adapted to support the third body segment when the projector is in its operating configuration, wherein the cap provides a stable support to the projector on flat surfaces.

* * * * *